Patented May 16, 1933

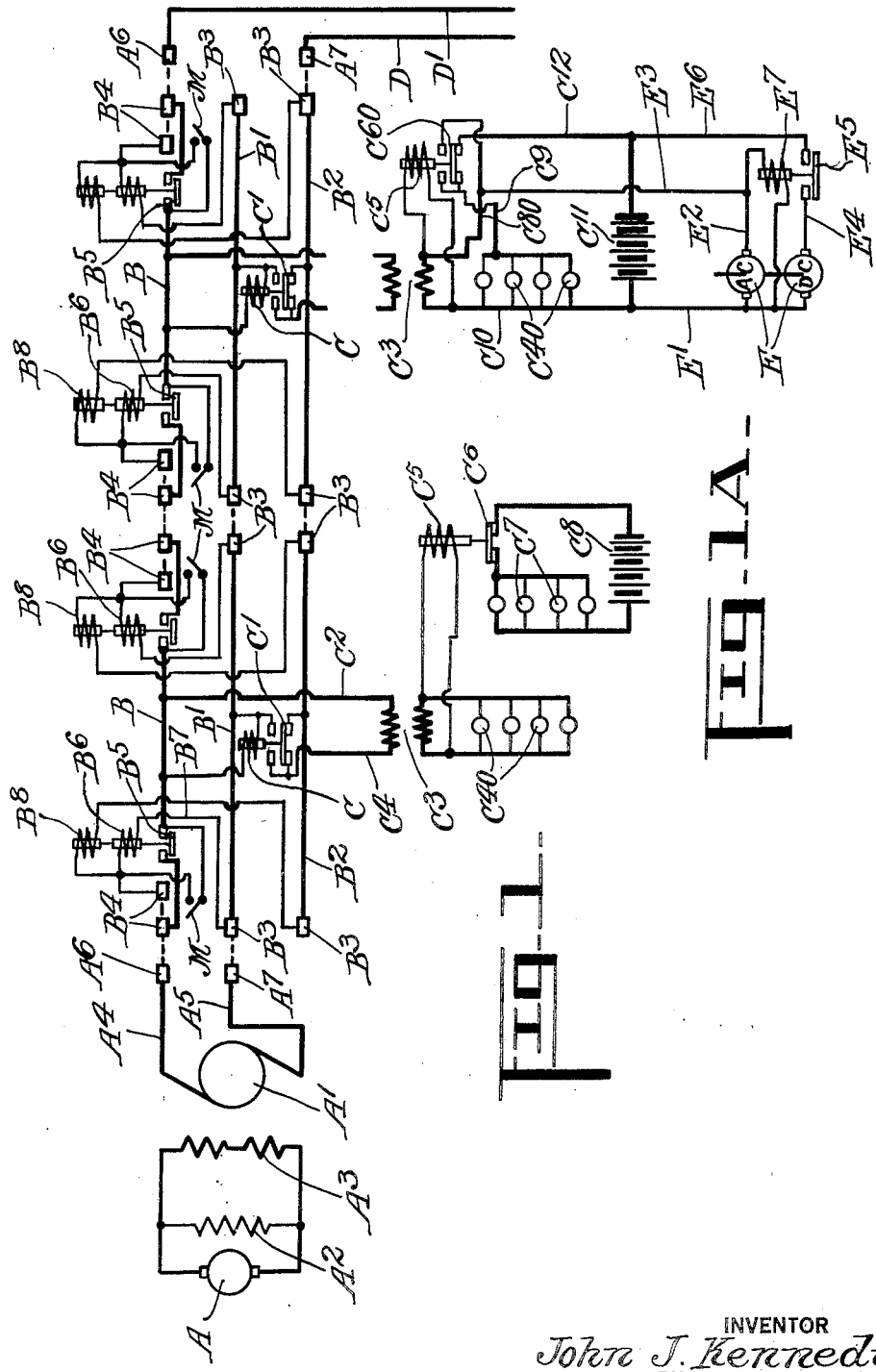
May 16, 1933. J. J. KENNEDY 1,908,985
ELECTRIC TRAIN LIGHTING SYSTEM
Filed March 7, 1930  2 Sheets-Sheet 1
INVENTOR
John J. Kennedy
BY
Parker + Carter
ATTORNEYS.

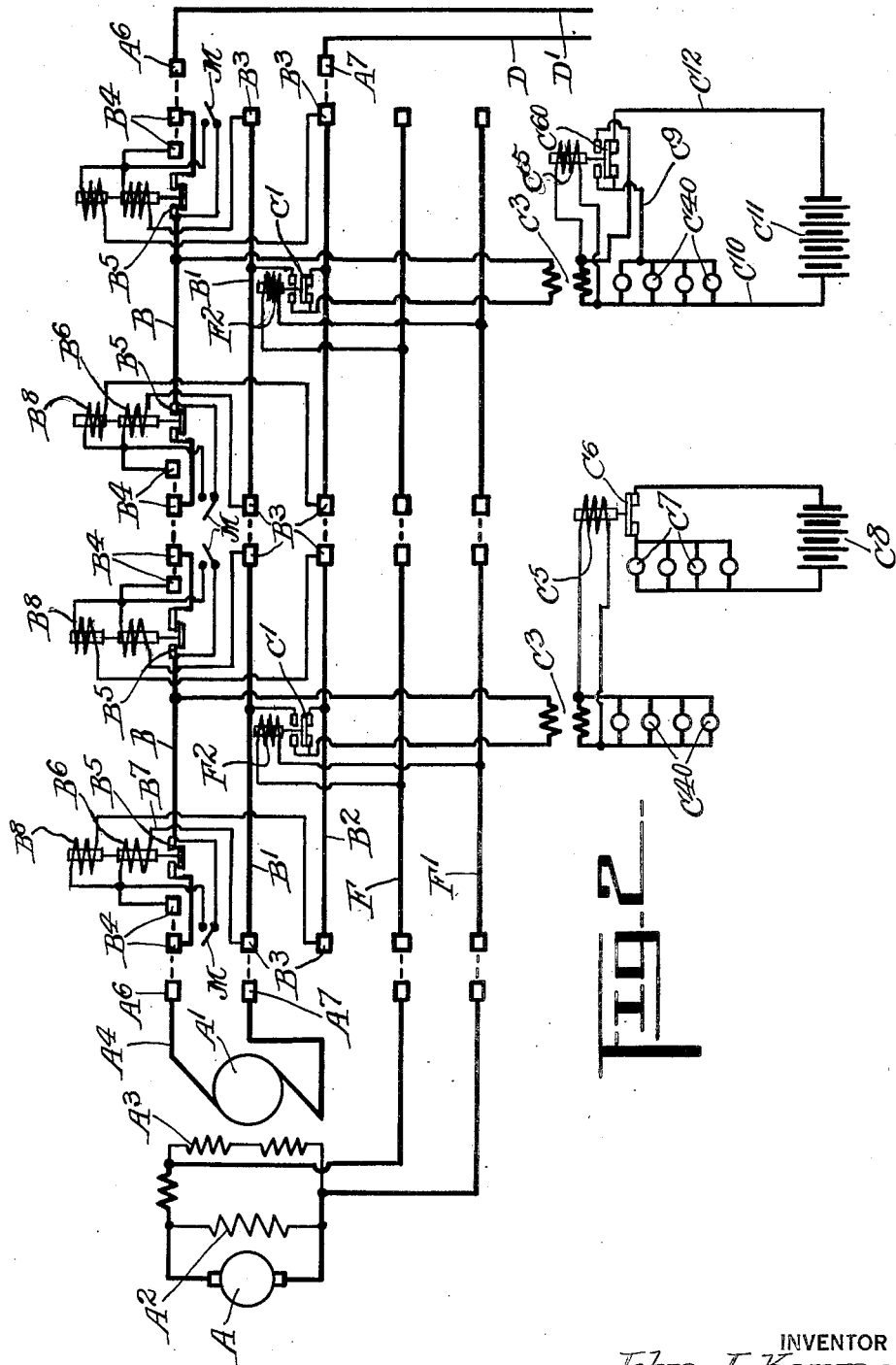

1,908,985

UNITED STATES PATENT OFFICE

JOHN J. KENNEDY, OF CHICAGO, ILLINOIS, ASSIGNOR TO THE PYLE-NATIONAL COMPANY, OF CHICAGO, ILLINOIS, A CORPORATION OF NEW JERSEY

ELECTRIC TRAIN LIGHTING SYSTEM

Application filed March 7, 1930. Serial No. 433,878.

My invention relates to improvements in train lighting systems and circuits therefor and is illustrated more or less diagrammatically in the accompanying drawings, wherein—

Figure 1 is a diagrammatic showing of the preferred circuit connections in the system of my invention;

Figure 1A is a diagrammatic showing of a modified circuit in my system for selectively lighting the train lights from the train line or the battery; and Figure 2 is a diagrammatic showing of a modified form of my system.

In general my invention relates to a train lighting system where high tension, alternating current is generated on the locomotive and supplied to the train through a transmission line, there being a part of the transmission line on each car and wherein the parts of the line on successive cars are coupled together when the train is coupled together to provide a unit transmission system through which power is fed from the generator on the locomotive. This transmission system is associated on each car with a transformer to reduce the transmission voltage to the lower voltage normally used in car lighting. There is also associated with this system what is called a wayside line extending throughout the train so that when the engine is not furnishing current, a power source at the station or on the wayside may be connected to furnish current. Likewise in view of the possibility, that there may be periods when neither the wayside nor the engine power source is available, there is also carried on each car a storage battery which is preferably kept charged by the transmission system which battery will automatically light some or all of the lights when the transmission line is dead.

This contemplates and requires a relatively high voltage and of course when all the lights are burning a relatively high ampere load on the line. It frequently happens that cars are cut in and out of the train while the lights are burning and the making and breaking of the circuit at the connector between cars in the train becomes exceedingly important because unless some special form of switch or connector is used, the connectors will before they are entirely engaged or disengaged arc and burn, so my invention is primarily concerned with a system wherein the full load is automatically kept off the connector until the connection is completely made.

A is the direct current exciter rotor associated with the alternating current rotor $A^1$ and the excitation coils $A^2$ $A^3$. This makes up diagrammatically the alternating current high tension generator which is on the locomotive. The conductors $A^4$ $A^5$ on the locomotive lead to terminal plugs $A^6$ $A^7$. As shown in the drawings, there are illustrated diagrammatically the wiring for two cars.

There extends throughout the entire train three transmission lines. B B is the common line so-called because it is common both to the locomotive power system and to the wayside power system. $B^1$ $B^1$ is the generator line, it being supplied with current from the generator on the locomotive only. $B^2$ $B^2$ is the wayside line, it being supplied with current from a wayside source of power when the locomotive generator is not active. The generator and wayside lines have conventional types of contact terminals $B^3$ $B^3$ as indicated and connections are made with them in the usual manner. The common line has a two step connector $B^4$ $B^4$. When the connection is made at any of the connectors $B^4$, an electric circuit will be closed considering first the connection between $A^6$ and $B^4$ but the circuit is broken at the switch $B^5$ so no current flows. Further movement brings the second half of the connector $B^4$ into contact with generator voltage which energizes coil $B^6$ thus closing the switch $B^5$ and delivering power to line B through the car. Thus the only current made or broken at the connector is the small amount which goes through the switch energizing coil. This provides for a closing of the circuit under relative high voltage and relatively large current values by an automatic switch, the timing and operation of which is not under the control of the operator and takes place at a point removed from the connector member, thus avoiding all possibility of burning out the connector member, and removing fire hazard and damage to operator. The situation is exactly the same at each of the other connectors $B^4$ and current only goes through the entire line when these individual contact members have been closed as above indicated.

The contacts at M are arranged so that they will be bridged when a connector plug is completely inserted in the connector $B^4$, the plug in this position being in engagement with the second contact element. When the contacts at M at one end of a car are closed, that side of the coil $B^6$ which is connected to the second contact $B^4$ at that end of the car is also connected to the line B thereby permitting energization of coil $B^6$ when either the line B or the second contact $B^4$ and the line $B'$ are energized.

In order that the feature of the present invention, which has just been described, may be more readily appreciated, the connection of a first car to the generator, and thereafter the connection of a second car to the first car, will be described in detail.

Referring to Figure 1, let it be assumed that the terminal plugs $A^6$—$A^7$ are connected respectively to the connector $B^4$ and contact terminal $B^8$ of the first car, as shown. The line $B^1$ of the first car is immediately connected to one side of the generator. The line B of the first car, it will be observed is not connected to the other side of the generator until after the terminal plug $A^6$ has been entirely connected to the connectors $B^4$, the connection of line B being established by virtue of the closing of switch $B^5$ at the corresponding end of the car which is being connected.

When the terminal plug $A^6$ is in electrical connection with the first contact element of connector $B^4$, the other side of the generator is connected to one terminal of the switch $B^5$ and upon electrical connection of the plug $A^6$ with the second contact element of connector $B^4$, one terminal of the coil $B^6$ of switch $B^5$ is connected to one side of the generator, the other terminal of the coil $B^6$ having already been connected to the other side of the generator, when the terminal plug $A^7$ was connected to contact terminal $B^8$. Although the contacts at M are closed when the second contact element $B^4$ is engaged, this will not be effective to cause energization of coil $B^6$, since this coil is connected through the contact M to line B which is not energized in this instance until switch $B^5$ has closed. The coil $B^6$ now being connected to the generator as described above, the switch $B^5$ is closed and the line B of the first car is energized.

It will now be observed that, when the first car has been connected as described, the contact terminal $B^8$ in the line $B^1$ at the other end of the first car will be "alive", but the contact elements of the connector $B^4$ will be "dead", since the switch $B^5$ at that end of the car has not been closed.

The second car may now be connected to the first car by respectively interconnecting the contact terminals $B^8$—$B^8$ and the connectors $B^4$—$B^4$ at the adjacent ends of the first and second cars. During the interconnecting of the connectors $B^4$—$B^4$ of the two cars the contacts at M at their adjacent ends will be closed. Closing of the contacts M of the first car will cause the coil $B^6$ at this end to be energized and close the switch $B^5$, this coil now being supplied with current from the line B through contacts M and thence to line $B^1$. The connectors $B^4$ and contact terminal $B^8$ on the first car are both "alive" and, since the second car is connected thereto, the lines B and $B^1$ of the second car will be energized in the same manner as when the first car was connected to the terminal plugs $A^6$—$A^7$.

When there is current on the lines B $B^1$, the coil C is excited and this moves the switch $C^1$ from the position shown in Figure 1 to close a circuit from the line B through wires $C^2$ transformer $C^3$ wires $C^4$ switch $C^1$ to the line $B^1$. When this takes place, the train lighting generator on the locomotive carries the load, the lines $C^4$ and $C^2$ being energized to the transformer to light the car. When the transformer is furnishing power to the lights it also excites the coil $C^5$ to hold the switch $C^6$ in the open position. When no power is furnished from the train line, the coil $C^5$ is not energized, the switch $C^6$ is closed and the lights $C^7$ are lighted by the battery $C^8$. In this instance, these lights are separate from the normal car lighting system and act as an emergency circuit. In the modified form of apparatus shown in Figure 1A, the lights $C^{40}$ are adapted to be lighted selectively from the train line or from the battery. When the locomotive alternator line is energized, the coil $C^5$ is active, the switch $C^{60}$ is actuated to close a circuit from the transformer $C^3$ through wire $C^{80}$ switch $C^{60}$ wire $C^9$ lamps $C^{40}$ wire $C^{10}$ back to the transformer. When, however, the coil $C^5$ is not energized, the switch $C^{60}$ is in its normal position as shown and establishes a circuit from battery $C^{11}$ wire $C^{10}$ lights $C^{40}$ wire $C^9$ switch $C^{60}$ wire $C^{12}$ back to the battery. In this case the same lights are selectively lighted either by the battery or by the train line.

D $D^1$ are wires bringing power from a wayside source of power. These wires communicate with B and $B^2$. When there is no current in $B^1$, the coils C are not energized and the switches $C^1$ are in the position shown in the drawings. In that case the transformers $C^3$ are furnished with power from the wayside source from lines B and $B^2$, the operation being exactly the same as before the line contactor being closed by means of the coils $B^8$.

Referring again to the showing in Figure 1

1A, E is an AC—DC conversion unit. The wire $E^1$ leads from the wire $C^{10}$ to this unit and is common to both the AC and the DC circuits. When power is furnished by the transformer $C^3$ from the train line a circuit is closed through $C^{10}$, $E^1$, the AC conductor $E^2$, conductor $E^3$ back to the line $C^{30}$ and the rotor operates the DC generator delivering current to charge the battery, the switch $E^5$ being closed by the coil $E^7$ energized from the AC line. When, however, the AC is off the shunt coil is no longer active, the switch $E^5$ is open and there is no circuit through the DC generator so that the battery is charged only when alternating current power is supplied.

In the modified system shown in Figure 2, the only difference is that the power to control the switch $C^1$ is taken not from the AC line as in Figure 1 but from a separate DC line F $F^1$ which line carries direct current drawn from the excitor side of the generator on the locomotive. When the locomotive is furnishing power, the coils $F^2$ operate the switches $C^1$ just as do the coils C in connection with the AC control arrangement.

In the claims I have referred to the generator as being on a car. Obviously the generator may be on the locomotive, the baggage coach, the tender or anywhere else because every single separate element of the train, be it locomotive, tender or any other vehicle is in the broad sense and in the sense in which I used that language, a car.

I claim:

1. In an electric train lighting system, a sectional transmission line having elements on each car of a train, a generator connected to the elements on one car, connectors between the transmission line elements on adjacent cars, and automatic means on each car responsive to the engagement of the connectors therewith for closing the circuit through the elements thereon after the connectors have been entirely engaged and opening the circuit prior to the entire disengagement of the connectors, a wayside source of power connected to the elements on one car and adapted to work selectively with the principal power source from the generator to supply the lights of the car and automatic means for rendering the wayside power source inactive when the principal car source is in operation.

2. In an electric train lighting system, a sectional transmission line having elements on each car of a train, a generator connected to the elements on one car, connectors between the transmission line elements on adjacent cars, automatic means on each car responsive to the engagement of the connectors therewith for closing the circuit through the elements thereon after the connectors have been entirely engaged and opening the circuit prior to the entire disengagement of the connectors, said means comprising circuit breaking switches normally in the open position and means responsive to the engagement of the connector for closing them, a wayside source of power connected to the elements on one car and adapted to work selectively with the power source from the generator to supply the lights of the car, and automatic means for rendering the wayside power source inactive when the car source is in operation.

3. In an electric train lighting system, a sectional transmission line having elements on each car of a train, a generator connected to the elements on one car, connectors between the transmission line elements on adjacent cars, automatic means on each car responsive to the engagement of said connectors therewith for closing the circuit through the elements thereon after the connectors have been entirely engaged and opening the circuit prior to the entire disengagement of the connectors, said means comprising circuit breaking switches normally in the open position and means responsive to the engagement of the connector for closing them, said means comprising a high resistance shunt coil adapted to be energized only after the connecting elements have been brought together, a wayside source of power connected to the elements on one car and adapted to work selectively with the power source from the generator to supply the lights of the car, and automatic means for rendering the wayside power source inoperative when the principal car source is in operation.

4. In an electric train lighting system, a sectional transmission line having elements on each car of a train, a generator connected to the elements on one car, connectors between the transmission line elements on adjacent cars, and automatic means on each car responsive to the engagement of the connectors therewith for closing the circuit through the elements thereon after the connectors have been entirely engaged, said means comprising circuit breaking switches normally in the open position and means including a control circuit responsive to the engagement of the connector for closing them, said means comprising two terminals in the connector, the one first engaged being adapted to carry the full load, the one second engaged being adapted to close the circuit to close the switch, a wayside source of power connected to the elements on one car and adapted to work selectively with the power source from the generator to supply the lights of the car, and automatic means for rendering the wayside power source inactive when the principal car source is in operation.

5. A train lighting system comprising a transmission line made up of three parallel branches, divided into sections on each car, of generator on one car, a wayside source of power, one of said lines being connected with both sources of power, the other lines being connected one with the generator on the car and one with the wayside power source, and automatic means adapted to cut the wayside line out of the system electrically when the generator line is energized and to connect the wayside line with the system when the generator line is not energized.

6. A train lighting system comprising a transmission line made up of three parallel branches and divided into sections on each car, of generator on one car, a wayside source of power, one of said lines being connected with both sources of power, the other lines being connected one with the generator on the car and one with the wayside power source, and automatic means adapted to cut the wayside line out of the system electrically when the generator line is energized and to connect the wayside line with the system when the generator line is not energized, removable connectors interposed between the elements on each car and automatic means for maintaining the transmission line circuits open until the connectors have been entirely engaged.

7. A train lighting system comprising a transmission line made up of three parallel branches and divided into sections on each car, of a generator on one car, a wayside source of power, one of said lines being connected with both sources of power, the other lines being connected one with the generator on the car and one with the wayside power source, and automatic means adapted to cut the wayside line out of the system when the generator line is energized and to connect the wayside line with the system when the generator line is not energized, removable connectors interposed between the sections on each car and automatic means for maintaining the transmission line circuits open until the connectors have been entirely engaged, and automatic means responsive to the final engagement of the connectors for closing such means for maintaining the transmission line circuits open.

8. A lighting system for cars, a car having a normally open high tension circuit with terminal connectors on the car at each end of said circuit, said connectors being adapted for connection to a source of power, a low tension lighting circuit on the car connected to said high tension circuit, and automatic means on said car for closing said high tension circuit in response to the connection of the power source to the connectors at either end of said high tension circuit.

9. A lighting system for cars, a car having a normally open high tension circuit with terminal connectors on the car at each end of said circuit, said connectors being adapted for connection to a source of power, a low tension lighting circuit on the car connected to said high tension circuit, and automatic means on said car for closing said high tension circuit in response to the connection of the power source to the connectors at either end of said high tension circuit, said means being arranged to close said high tension circuit after the power source connection therewith is established.

10. A lighting system for cars, a car having a normally open high tension circuit with terminal connectors on the car at each end of said circuit, said connectors being adapted for connection to a source of power, a low tension lighting circuit on the car connected to said high tension circuit, and automatic means on said car for closing said high tension circuit in response to the connection of the power source to the connectors at either end of said high tension circuit, said means being arranged to close said high tension circuit after the power source connection therewith is established and open said circuit prior to the disconnection of said power source therefrom.

11. In a train lighting system, a transmission line having a section on each car of the train, a load circuit connected to each section of the transmission line, connectors for electrically connecting the sections on adjacent cars, and means on each car for normally maintaining its section open circuited, said means being automatically responsive to close its associated section to energize the load circuit connected to said associated section when connectors are disposed between that section and an already energized section at either end of that section.

12. In a train lighting system, a transmission line having a section on each car of the train, a load circuit connected to each section of the transmission line, connectors for electrically connecting the sections on adjacent cars, and means on each car for normally maintaining its section open circuited, said means being automatically responsive to close its associated section to energize the load circuit connected to said associated section after an electrical connection is established by said connectors between that section and an already energized section at either end of that section.

13. In a train lighting system, a transmission line having a section on each car of the train, a load circuit on each car connected to the section of the transmission line thereon, connectors for electrically connecting the sections on adjacent cars, a normally opened switch member in each section disposed between the load circuit connection thereto and the connectors to the sections on adjacent cars, means on each car for actuating one of the switch members when the section on that car is connected to an already energized section and the other of said switch members when that section is connected to a section to be energized.

Signed at Chicago, county of Cook and State of Illinois, this 25th day of February, 1930.

JOHN J. KENNEDY.